United States Patent
Belanger et al.

(10) Patent No.: US 6,279,190 B1
(45) Date of Patent: Aug. 28, 2001

(54) CONTACT TYPE VEHICLE LAUNDRY ELEMENT AND ATTACHMENT SYSTEM THEREFOR

(75) Inventors: Michael J. Belanger, Novi; Robert J. Wentworth, Farmington Hills, both of MI (US)

(73) Assignee: Belanger, Inc.

( * ) Notice: Subject to any disclaimer, the term of this patent is extended or adjusted under 35 U.S.C. 154(b) by 0 days.

(21) Appl. No.: 09/498,407

(22) Filed: Feb. 4, 2000

(51) Int. Cl.[7] ....................................................... B60S 3/06
(52) U.S. Cl. ..................................... 15/230.16; 15/230.19
(58) Field of Search ............................... 15/230–230.19, 15/147.1, 150, 151, 223, 224, 226

(56) References Cited

U.S. PATENT DOCUMENTS

| | | | |
|---|---|---|---|
| 750,280 | * | 1/1904 | Heimann ................................. 15/223 |
| 2,462,741 | * | 2/1949 | Hall ..................................... 15/230.14 |
| 2,484,994 | * | 10/1949 | Hall ..................................... 15/230.14 |
| 2,583,632 | * | 1/1952 | Coultier et al. ...................... 15/230.14 |
| 2,645,065 | * | 7/1953 | Kietzmann .......................... 15/230.14 |
| 2,668,398 | * | 2/1954 | Busch et al. ....................... 15/230.14 |
| 2,879,631 | * | 3/1959 | Peterson ......................... 15/230.14 X |
| 3,417,420 | * | 12/1968 | Rock ................................... 15/230.16 |
| 5,461,745 | * | 10/1995 | Nittoli ........................... 15/230.16 X |
| 6,161,242 | * | 12/2000 | Cabrero Gomez et al. .......... 15/147.1 |

\* cited by examiner

*Primary Examiner*—Mark Spisich
(74) *Attorney, Agent, or Firm*—Young & Basile

(57) ABSTRACT

A surface treatment apparatus comprising in combination a carrier hub having uniformly spaced parallel slots with narrow outwardly extending openings to receive the aligned heads of a unitary flange like retainer on which are removably mounted a plurality of folded cloth like surface contacting elements. The elements are preferably formed of pliable foam plastic sheeting. This particular arrangement obviates the need for stapling or stitching the cloth like elements.

7 Claims, 3 Drawing Sheets

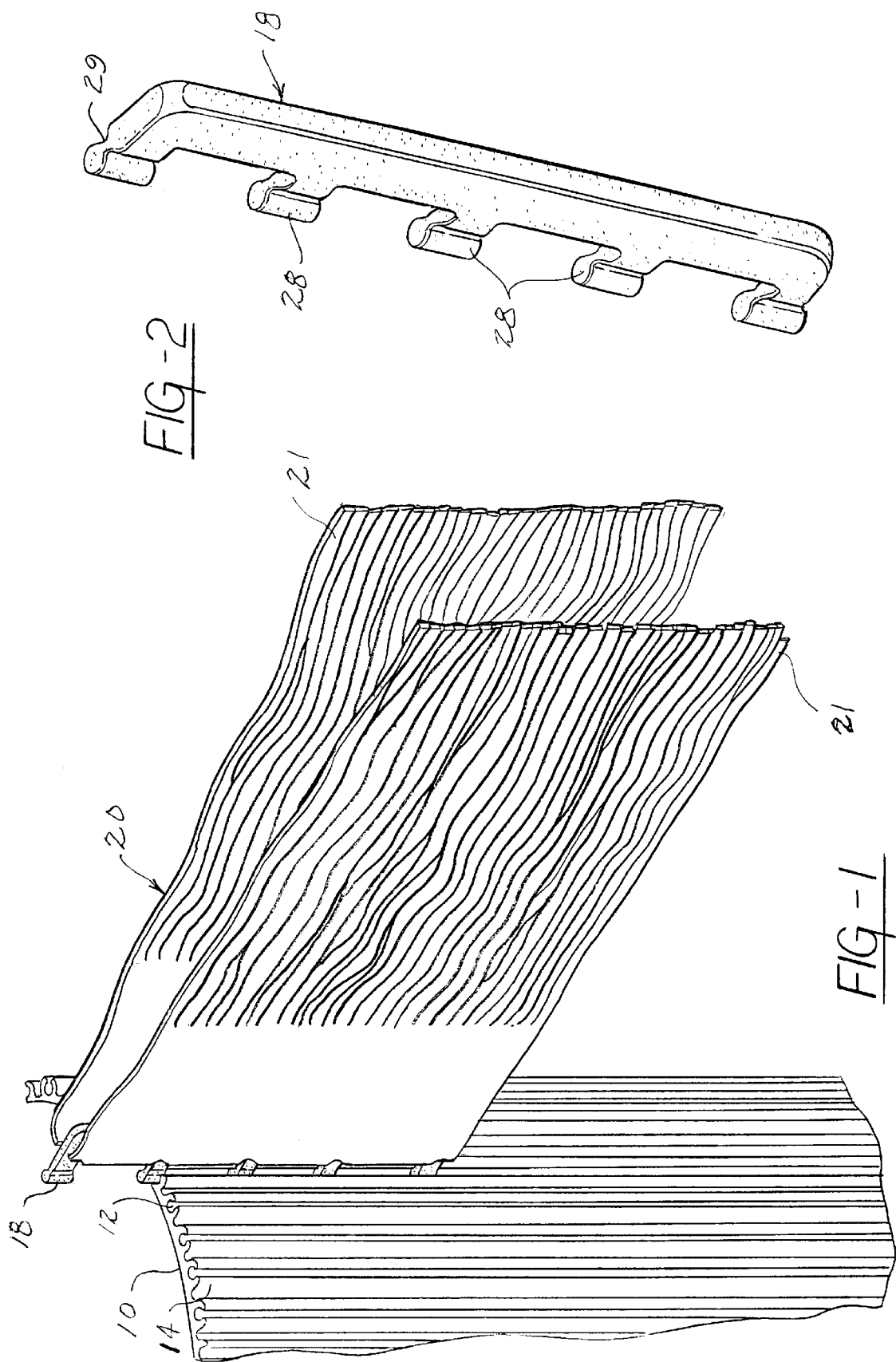

CONTACT TYPE VEHICLE LAUNDRY ELEMENT AND ATTACHMENT SYSTEM THEREFOR

FIELD OF THE INVENTION

This invention relates to apparatus for performing surface treatments such as contact-washing of vehicles and more particularly to an apparatus which facilitates the construction and reconstruction of rotary, oscillatory and stationary devices such as surface-contact brushes and curtains having outwardly extending and/or depending elements of cloth like material.

BACKGROUND OF THE INVENTION

It is known to construct surface treatment devices such as rotary car wash brushes and depending friction curtains using strips of pliable material such as non-woven needle punched felt and/or pliable foam plastic. To construct such a combination, the strips may be folded around a length of a rigid plastic rod and stapled or stitched together to form an edge bead. This edge bead can then be inserted end-wise into a slot in a hub or other carrier structure, the slot having a circular cross section and a narrow opening which permits the material of the element to extend outwardly or downwardly therefrom. An example of this structure in a friction curtain apparatus is illustrated in U.S. Pat. No. 4,096,600 issued Jun. 27, 1978 to James A. Belanger of Northville, Mich. A similar structure wherein the carrier is arcuate and used to form a brush hub is illustrated in the U.S. Pat. No. 4,005,028 issued Oct. 25, 1977 to James A. Belanger of Northville, Mich. As is more fully explained in the '028 patent, the surface treatment element may be abrasive for working or burnishing, or may comprise soft, non abrasive materials for washing, drying, buffing or polishing automobiles and other articles.

SUMMARY OF THE INVENTION

According to one aspect of the present invention an improved structure is provided from which to construct surface treatment combinations including but not limited to rotary brushes and depending friction curtains for auto laundries wherein the pliable surface contacting elements are made of materials such as foam plastics which are not readily stapled or stitched. An example of such material is closed cell, foam polyethylene sheet. Other materials may be used to essentially equal advantage; e.g., non-woven felt and conventional woven cloth.

In general, the combination of the present invention comprises a carrier or hub, the specific configuration (flat or arcuate) being chosen according to the wishes of the designer, wherein the carrier defines a plurality of parallel slots having narrow openings. The combination further comprises a plurality of retainer devices which receive and hold the contact strips and which are characterized by a relatively thin flange having integral therewith a plurality of laterally extending and longitudinally aligned enlarged heads of such size and configuration as to fit complementally within the slots of the carrier such that the flange body projects through the narrow openings and outwardly away from the carrier body. The combination further comprises a plurality of pliable surface treatment elements of cloth like material including but not limited to foam plastic sheeting which is adapted to be folded over and mounted loosely on the flanges with the heads thereof projecting through apertures in the material. The apertures are located essentially at the mid-point of the material strips so that essentially equal lengths of material extend away from the retainer elements when they are disposed in the slots of the carrier. The carrier is typically secured to a axle, linkage or other mounting structure to provide for a rotary or oscillatory motion as desired.

According to a second aspect of the invention, a surface-contact treatment element is provided in the form of a sheet of cloth-like material, preferably pliable, foam plastic sheet, having left and right mirror-image portions and a laterally notched or die-cut center area. In the preferred form, the mirror-image portions are rectangular and are slit to define a plurality of soft, parallel surface-contacting fingers.

BRIEF DESCRIPTION OF THE DRAWING

FIG. 1 is a perspective drawing of a portion of a brush hub illustrating one form of the invention;

FIG. 2 is a perspective view of a suitable retainer element;

DETAILED DESCRIPTION OF THE ILLUSTRATIVE EMBODIMENT

Figure 3:
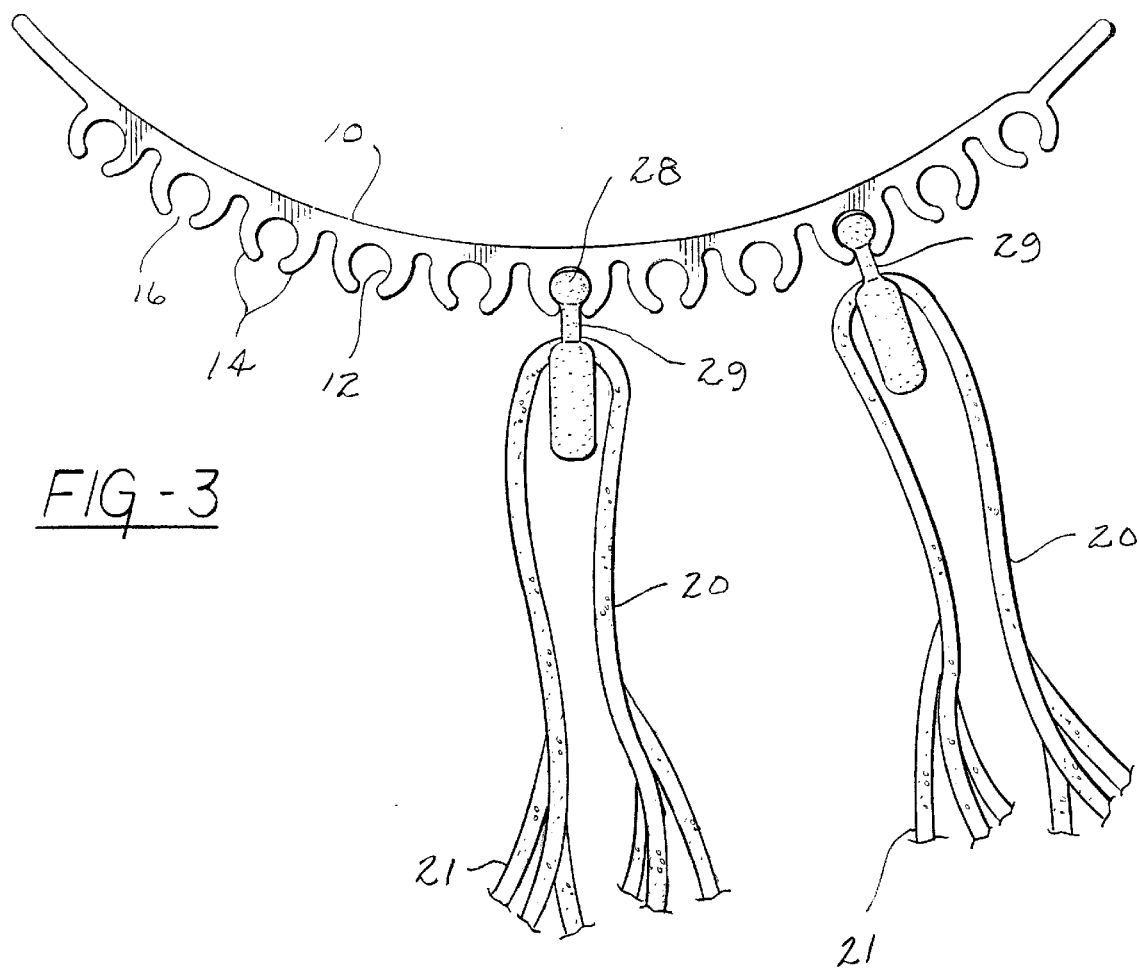
FIG. 3 is a side view of the hub section of FIG. 1.

Referring to the drawing, there is shown a carrier body 10 in the form of an aluminum hub section having formed on one surface thereof a plurality of uniformly spaced parallel slots 12 defined by sets of reversely similar outwardly extending projections 14 defining narrow openings 16. The apparatus further comprises a plurality of plastic retainers 18 having head portions 28 more fully illustrated in and described with reference to FIG. 2 which are adapted to slidingly fit within the slots of the hub 10 and to carry folded lengths of vehicle laundry elements 20 which in this instance are slit at the opposite ends to provide independent surface contacting fingers 21. The elements 20 are preferably made of a low-absorbtivity, closed cell, foam plastic such as polyethylene but can be made of other materials such as but not limited to the well known non-woven needle punched felt and/or conventional woven cloth.

The retainers 18 are formed so as to exhibit four longitudinally spaced and aligned heads 28 which are cylindrical in configuration and have a diameter which is greater than the thickness of the flange 29 which integrates the heads 28 into a unitary body. The thickness of the flange 29 is such that it can project through the narrowed opening 16 between the projections 14 defining the slots 12 as shown in FIG. 1.

Figure 4:
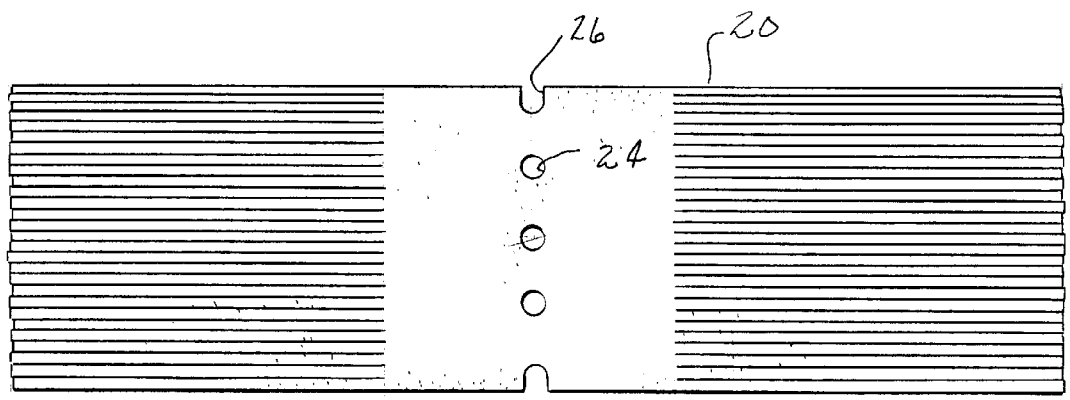
FIG. 4 is a plan view of a suitable surface contact element.
Figure 5:
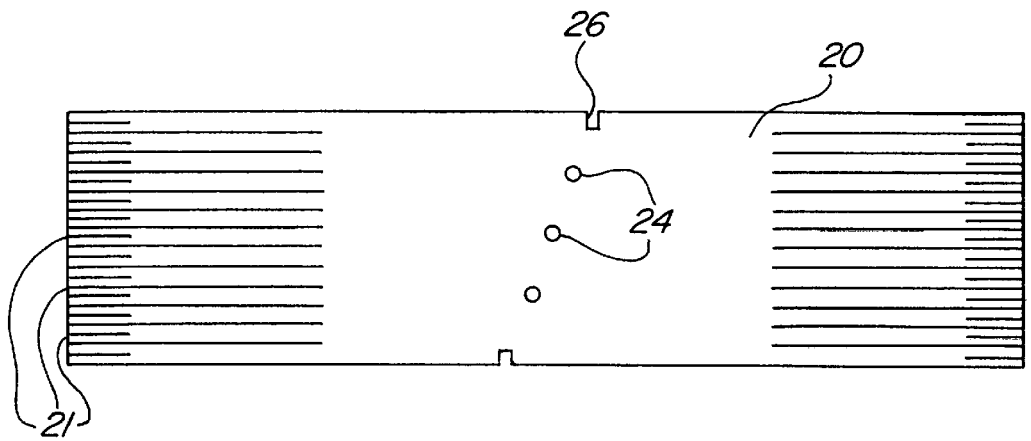
FIG. 5 is a plan view of an alternative element design.

Elements 20 are rectangular and are die-cut as shown in FIGS. 4 and 5 to form holes 24 and edge notches 26 essentially along a transverse centerline. In FIG. 4, the holes 24 and notches 26 line along an orthogonal centerline such that when folded, the side edges of the left and right mirror image portions line up with one another. In FIG. 5, the holes 24 and notches 26 are skewed about 10 degrees so that, when folded, lengths are slightly splayed to increase the contact coverage area. The retainers have bearing surfaces 30 between the heads 28 to support the folded material of the element 20 between the slots 24 and the edge notches 26.

Figure 6:
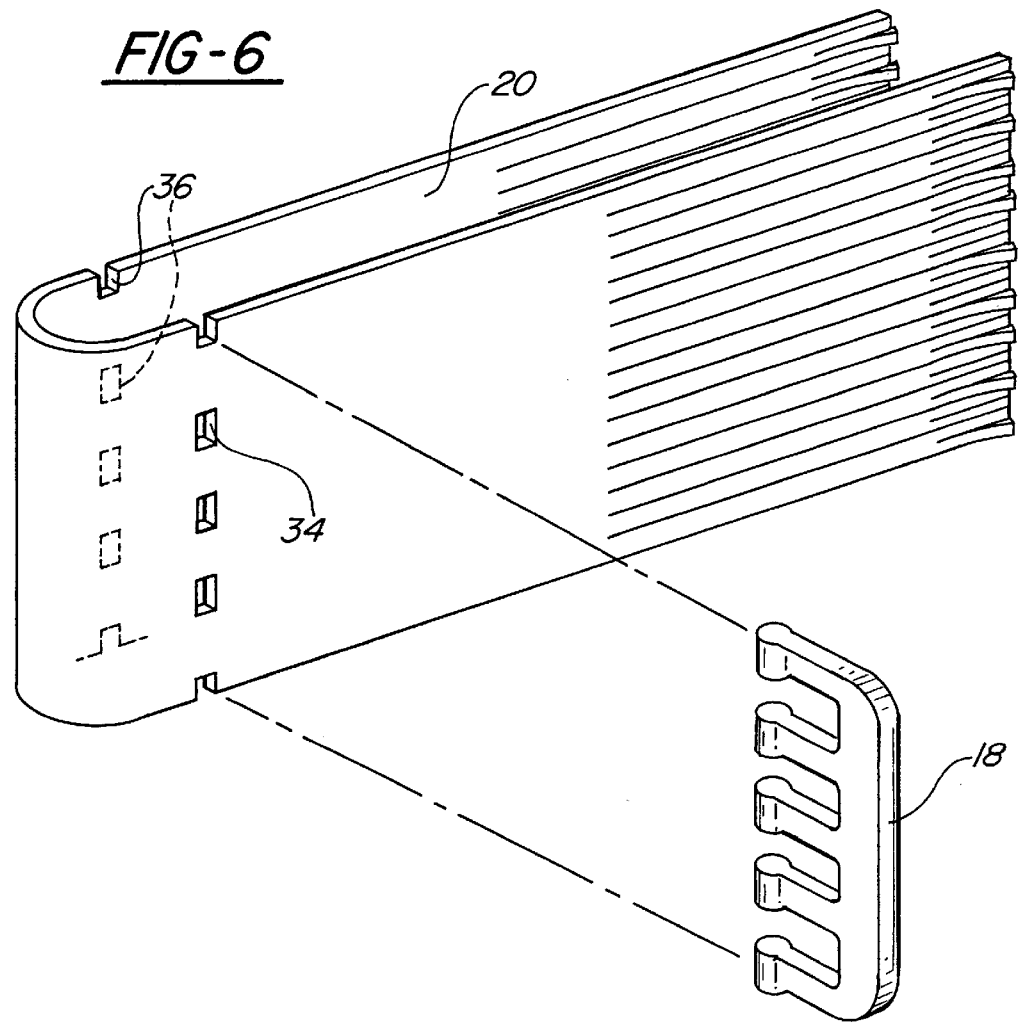
FIG. 6 is a perspective view of an alternative attachment configuration.

FIG. 6 shows another possible configuration wherein two rows of holes 34 and edge notches 36 are formed about one inch from the fold line and the retainer 18 is inserted through both rows before being placed into the carrier 10. This arrangement increased the amount of material at the interface between the retainer 18 and element 20 and provides greater resistance to tearing in the interface area.

As will be apparent to those skilled in the art, a number of the arcuate hub sections 10 may be assembled to a frame to form a brush which is typically rotated by an electric motor to contact the sides and/or front and rear surfaces of an automobile in a laundry operation. It will also be apparent that the hub portions 10 may be made flat to form on overhead curtain carrier which can be oscillated or used in a stationary fashion.

To assemble a brush, the heads 28 of a number of retainers 18 are thrust through the holes 24 and notches 26 of an equal number of suitably configured cloth like elements 20. The elements 20 are thereafter folded to provide substantially equal lengths of material in a parallel fashion as shown in FIGS. 1 and 2 with the whole material between the holes 24 and the notches 26 on the bearing surfaces 30. A number of such combinations may thereafter be slid into each of the slots 12 in the carrier 10 until the full length of each slot filled as desired. For example, if the slot length is 36 inches and the length of a retainer is 9 inches, four retainers are required. Each corresponding slot is similarly filled until the entire structure has been constructed. In a vertical brush, a bottom plate (not shown) is used to prevent the retainers from falling out the bottom of the slots.

As the elements 20 wear and/or fray, it is relatively simple matter to reconstruct the brush or curtain simply by sliding the retainers 18 out of the carrier slots and replacing the cloth like elements 20 with new material. It has been found that this structure is particularly suitable for use of foam plastic elements which are not readily secured by staples and/or stitching; i.e, the holes 24 and notches 26 and their interfitting relationship with the heads 28 or the retainers 18 hold the material securely in place while the substantial amount of unslotted material between the holes 24 and notches 26 operate in combination with the bearing surfaces 30 to prevent premature tearing.

With the holes 24 and notches 26 at least approximately along or on opposite sides of a centerline of the element 20, essentially equal lengths of the folded element extend away from the retainer 18 thereby providing two contacting ends for each retainer; i.e., twice the contact area and twice the cleaning action is provided in comparison to an arrangement wherein a short end is folded over and stitched to the longer length.

It will be apparent to those skilled in the art that numerous changes in the arrangement and configuration of the devices shown in the patent drawings may be made. For example, the retainers 18 may be longer such that a single retainer 18 kills the entire length of a slot in the carrier 10. Alternatively, the retainers 18 may be shorter such that two, three or more retainers are required to fill the carrier slot. The elements 20 may also be substantially wider or narrower than that shown with slit or unslit ends as suits the desires of a particular designer or operator.

What is claimed is:

1. A vehicle treatment apparatus comprising the combination of:
    a rigid carrier structure defining a plurality of parallel slots having openings facing away from said structure;
    at least one retainer comprising a flange and at least two spaced and aligned head portions extending laterally from said flange, said head portions corresponding in size and configuration with said slots so as to fit complementally and slidably therein, said heads defining intermediate bearing surfaces on said flange between said heads; and
    a plurality of elongate treatment elements of pliable material having apertures formed therein proximal a centerline thereof; said apertures being arranged so as to correspond in size and spacing to said heads;
    whereby an element may be placed on a retainer with the heads protruding through said apertures and with essentially equal lengths of treatment element material extending in at least approximately parallel fashion and in the same direction from said retainer, and said retainer may thereafter be placed in a slot in said carrier.

2. The apparatus defined in claim 1 wherein said carrier structure is arcuate.

3. The apparatus defined in claim 1 wherein said treatment elements are made of a foam plastic material.

4. The apparatus defined in claim 1 wherein said treatment elements are made of needle punched felt.

5. The apparatus defined in claim 1 wherein said elements are longitudinally slit at the distal ends thereof.

6. The apparatus defined in claim 1 wherein said apertures are arranged along a skewed, non-orthogonal centerline of the respective elements.

7. A replaceable cloth element for a rotary car wash brush of the type comprising a retainer including a flange and at least three spaced and aligned cylindrical head portions extending laterally from the flange so as to fit slidably in slots in a rigid carrier structure:
    said cloth element being essentially an elongate rectangle in shape and having split portions at the opposite ends thereof, and
    a linear series of spaced rectangular slots extending across the unslit center of said element to receive said head portions there through and thereafter to be folded over said retainer such that the opposite end portions thereof lie in parallel.

* * * * *